Figure 1:
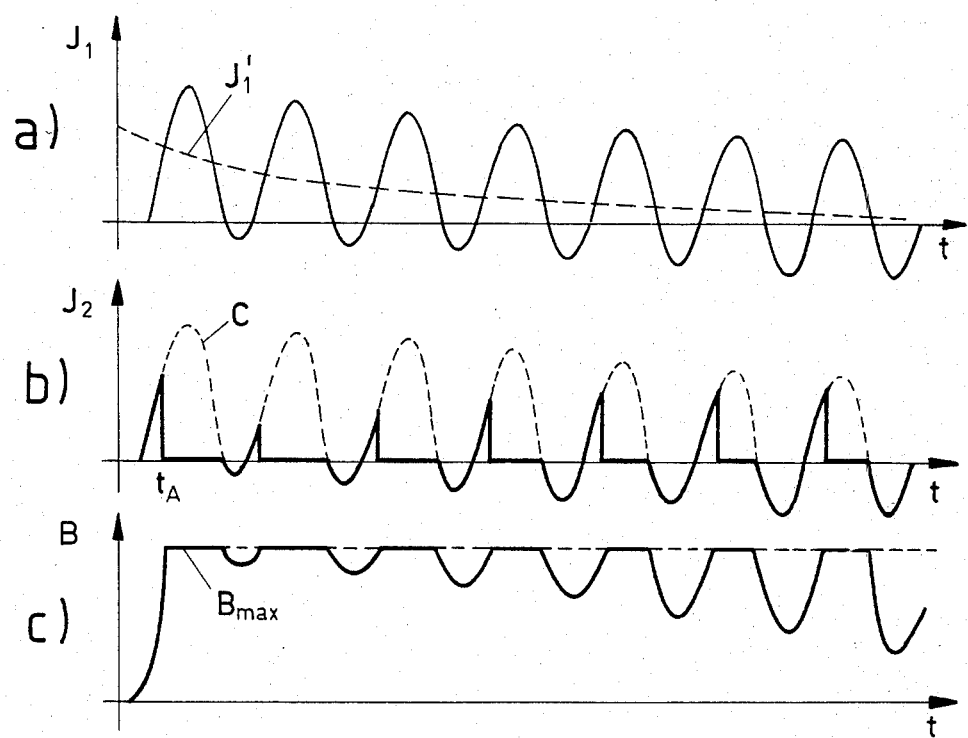

United States Patent [19]

Bulaty et al.

[11] Patent Number: 4,511,839

[45] Date of Patent: Apr. 16, 1985

[54] METHOD AND A SYSTEM FOR ANALYZING THE SECONDARY CURRENT IN A CURRENT TRANSFORMER, THE PRIMARY SIDE OF WHICH IS CONNECTED INTO A LINE OF AN ELECTRIC ENERGY SUPPLY NETWORK

[75] Inventors: Paul Bulaty, Wettingen; Ivan De Mesmaeker, Windisch; Zdenek Franc, Gebenstorf; Giuseppe Salerno, Untersiggenthal, all of Switzerland

[73] Assignee: BBC Brown, Boveri & Company, Limited, Baden, Switzerland

[21] Appl. No.: 477,645

[22] Filed: Mar. 22, 1983

[30] Foreign Application Priority Data

Mar. 29, 1982 [EP] European Pat. Off. ........ 82200381.0

[51] Int. Cl.³ .............................................. G01R 1/20
[52] U.S. Cl. .................................. 324/127; 324/117 R
[58] Field of Search .................. 324/117 R, 127, 253; 323/357, 358; 364/483, 577

[56] References Cited

U.S. PATENT DOCUMENTS 3,714,545  1/1973  Chiffert .............................. 323/358
4,255,704  3/1981  Milkovic ............................ 323/357

Primary Examiner—Stewart J. Levy
Attorney, Agent, or Firm—Burns, Doane, Swecker & Mathis

[57] ABSTRACT

The invention relates to a method and a system for analyzing the secondary current ($J_2$) of a current transformer (20), the primary side of which is connected into a line (10) of an electric energy supply network. When the current transformer (20) is saturated as the result of a short-circuit on the line (10), a saturation signal (X) indicating this saturation and a polarity signal (P) indicating the polarity of the displacement of the short-circuit current ($J_1$) are generated. The two signals (X, P) are used to select zero transitions of the secondary current ($J_2$), corresponding to the polarity of the displacement of the short-circuit current ($J_1$). After the selected zero-transitions, the secondary current ($J_2$) is extrapolated by a current signal (C), in accordance with its saturation-free curve-shape. The current signal (C) is finally supplied to protective systems, instead of the secondary current ($J_2$).

17 Claims, 3 Drawing Figures

METHOD AND A SYSTEM FOR ANALYZING THE SECONDARY CURRENT IN A CURRENT TRANSFORMER, THE PRIMARY SIDE OF WHICH IS CONNECTED INTO A LINE OF AN ELECTRIC ENERGY SUPPLY NETWORK

The present invention relates to a method and to a system for analyzing the secondary current in a current transformer, the primary side of which is connected into a line of an electric energy supply network, when the current transformer is saturated.

Such a method and such a system are used in all protective systems in which the secondary current is used as the measurable quantity for detecting short-circuits, that is to say, for example, in distance protection, directional protection or differential protection systems.

Such protective systems have the task of switching off the short-circuited part of the electric energy supply network as rapidly and as selectively as possible.

The functioning of the protective systems can, however, be greatly impaired as a result of the saturation of current transformers, since the saturation effects occur precisely as the result of short-circuits or, more accurately, are caused by the direct current components of the short-circuit currents.

The risk of current transformers becoming saturated in the event of short-circuits grows with the ever-increasing short-circuit power of electric energy supply networks. With the short-circuit power, the direct current component of the short-circuit currents also increases more and more, and reaches critical values for which the excess current limit of the current transformers installed in the energy supply network is frequently not designed.

One way of avoiding the saturation effects and their undesirable consequences on the protective systems would be to replace current transformers having too low an excess current limit by current transformers with an excess current limit which is designed to be adequate. This way is, however, very expensive.

Another way would be to take suitable precautions against the consequences of the saturation effects in the protective systems. One example for this has been disclosed in German Auslegeschrift No. 2,339,932. In this document, a distance protection method is described which analyzes the secondary current only within brief phases in time between two saturations in which an accurate image of the primary current is transferred to the secondary current. This method, however, presupposes that the protective systems are of special construction, and cannot, as a rule, be carried out with protective systems already installed in the energy supply network, since these too would have to be replaced with great economic expenditure.

It is therefore an object of the invention to provide in particular a simple and economical way, and a new method and a new system for the analysis of the secondary current in a current transformer, the primary side of which is connected into a line of an electric energy supply network, when the current transformer is saturated.

SUMMARY OF THE INVENTION

In accordance with the present invention, this object is achieved by generating a saturation signal which indicates the onset of saturation of the transformer and a polarity signal which indicates the polarity of the transformer primary current. Zero transitions of the secondary current are selected with the aid of the saturation and polarity signals, and the secondary current is sinusoidally extrapolated with a current signal.

A system for carrying out the method of the invention includes a saturation detector, a polarity detector, an extrapolation circuit and a switch each having an input connected to the secondary winding of the transformer. A zero-transition detector has inputs respectively coupled to the secondary winding, the saturation detector and the polarity detector, and its output is connected to the extrapolation circuit. The output of the extrapolation circuit is fed to a second input of the switch, and control of the actuation of the switch between the transformers and extrapolation inputs is carried out by the saturation circuit.

When the current transformer is saturated, the method according to the invention and the system according to the invention accordingly supply a current signal which is matched to the secondary current during saturation-free phases and which has a characteristic curve-shape such as would have to be expected for the secondary current if a non-saturating current transformer were used. For the duration of saturation, this current signal, instead of the secondary current, can subsequently be fed advantageously to the protective systems for analysis.

Considering economic aspects, the invention offers the advantage that no changes whatever need to be made either at the current transformers installed in the energy supply network or at the protective systems.

In addition, the invention is compatible, in an advantageous manner, with all types of current transformers and protective systems.

Figure 2:
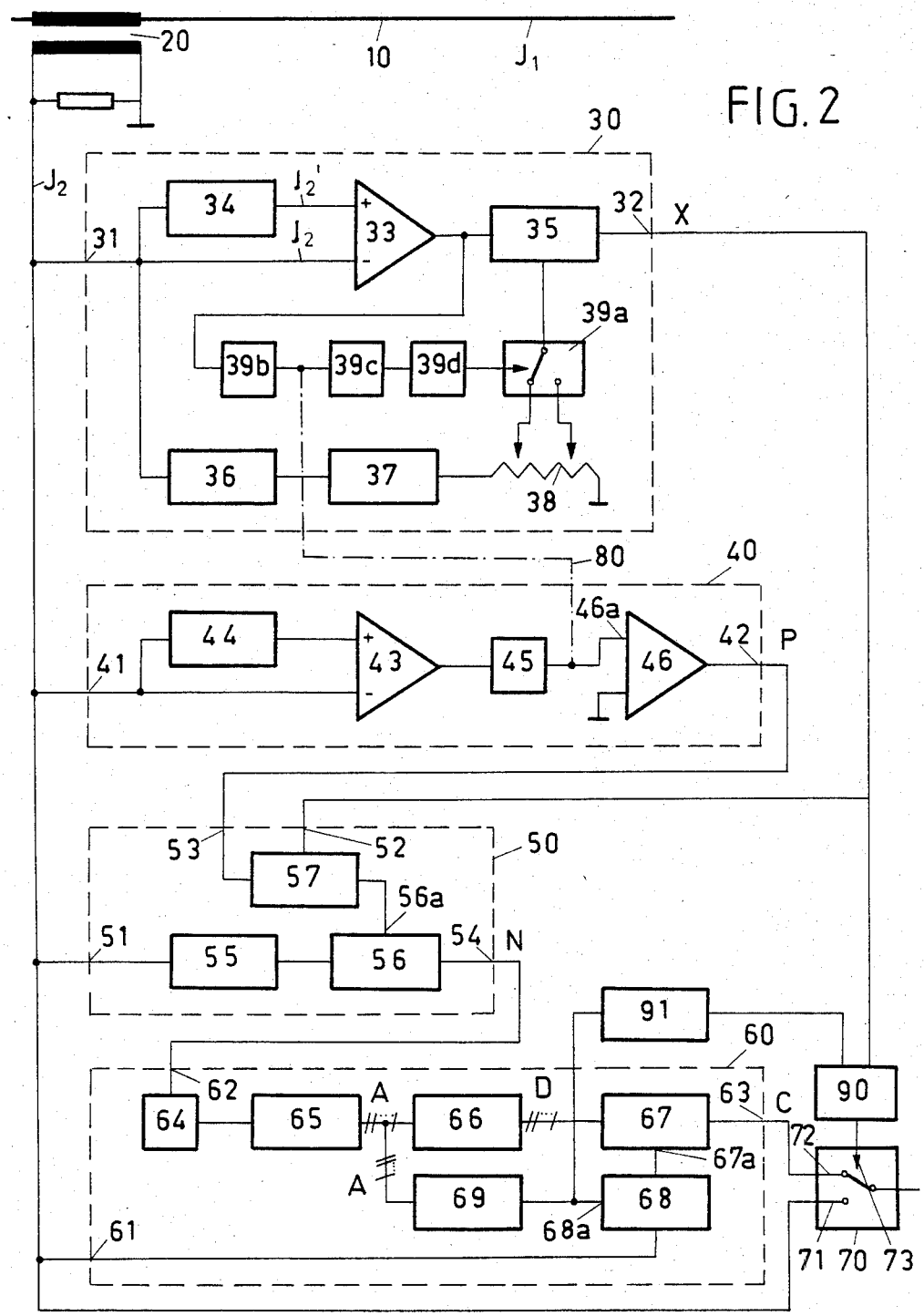
Figure 3:
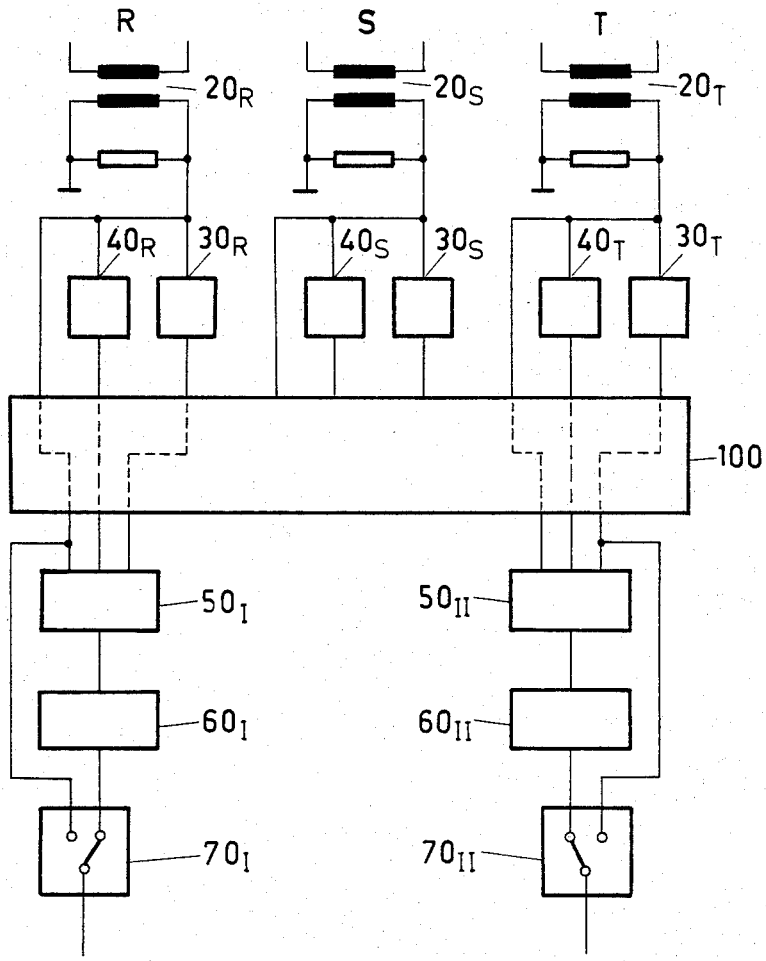

Further features and advantages of the invention can be seen from the illustrative embodiment which is explained, in the text which follows, with the aid of drawings, in which:

FIG. 1 shows, in three diagrams, the characteristic curve-shapes of the primary current, of the secondary current, of the current signal and of the magnetic induction of a current transformer during saturation, FIG. 2 shows a block diagram of a system according to the invention and FIG. 3 shows an application of the system according to the invention, in a multi-phase energy supply network.

FIG. 1a illustrates an example of the characteristic curve-shape of the short-circuit current, or primary current, $J_1$ of the current transformer during saturation. The short-circuit or primary current $J_1$ has been displaced far into the positive region by the exponentially decaying direct current component $J_1'$, and there assumes high values, so that the magnetic induction B, shown in FIG. 1c, of the current transformer reaches its saturation value $B_{max}$, beyond which it can no longer rise with the primary current $J_1$ and remains constant. The secondary current $J_2$, shown in FIG. 1b, equals zero when the induction B is constant in time. Thus the saturation of the current transformer leads to a distortion of the secondary current $J_2$ with respect to the primary current $J_1$. After a saturation period, transfer of an accurate image of the primary current $J_1$ to the secondary current $J_2$ does not recommence, at the earliest, before the first polarity change of the primary current $J_1$. If the decay time of the direct current component $J_1'$ is of the order of magnitude of one or several periods of the mains-frequency primary current $J_1$, saturation will occur several times in succession.

The current signal C, according to the invention, is marked by a dashed line in FIG. 1b, this signal being generated at saturation-free zero transitions of the secondary current $J_2$, in synchronism with the latter and at time $t_A$, being matched, on each occasion, to the instantaneous value of the latter and at the start of saturation forming, on each occasion, a sinusoidal extrapolation of the latter.

FIG. 2 shows the line 10 of an electric energy supply network into which the primary side of the current transformer 20 has been connected. On the secondary side, the saturation detector 30, the polarity detector 40 and, by their first inputs, 51, 61 and 71 respectively, the zero-transition detector 50, the extrapolation circuit 60 and the first switch 70, are connected in parallel to the current transformer 20.

The output 32 of the saturation detector 30 is connected to the second input 52 and the output 42 of the polarity detector 40 is connected to the third input 53 of the zero-transition detector 50. The output 54 of the zero-transition detector 50 is connected to the second input 62 of the extrapolation circuit 60. The output 63 of the extra-polation circuit 60 is connected to the second input 72 of the first switch 70, the switching input 73 of which is connected to the output 32 of the saturation detector.

With onset of saturation of the current transformer 20 the saturation detector 30 generates from the secondary current $J_2$ the saturation signal X indicating the onset of saturation and the polarity detector 40 generates from the secondary current $J_2$ the polarity signal P indicating the polarity of displacement of the primary current $J_1$. The saturation signal X and the polarity signal P are advantageously binary signals with a duration about one and a half times that of the period of the secondary current $J_2$. The polarity of the saturation is then expressed by the binary state of the polarity signal P.

According to the polarity of displacement of the primary current $J_1$, at saturation, that is to say when the saturation signal X is present, the polarity signal P is used at the zero-transition detector 50 to select zero transitions of the secondary current $J_2$ of equal polarity. FIG. 1 shows that these are just the zero transitions which are not affected by the saturation.

With each selected zero transition of the secondary current $J_2$ the zero-transition detector 50 generates the zero-transition signal N. After the zero-transition signal N has been received, the extrapolation circuit 60 generates the current signal C by extrapolation from the secondary current $J_2$. The current signal C is then fed, with the aid of the first switch 70, to the protective systems for further analysis, instead of the secondary current $J_2$. The first switch 70 is switched via the switching input 73 by the saturation signal X.

The saturation detector 30 is advantageously provided with the first difference generator 33, the first input of which is connected directly and the second input of which is connected, via the first frequency filter 34, to the first input 31 of the saturation detector. The first frequency filter 34 is advantageously a frequency band filter which has no attenuation and no phase shift for sinusoidal mains-frequency signals. The first frequency filter 34 is followed by the trigger 35, the output of which is connected to the output 42 of the saturation detector 30.

As long as the current transformer 20 transfers current without saturating, and generates a sinusoidal mains-frequency secondary current $J_2$, the first frequency filter 34 remains ineffective, so that the same secondary current $J_2$ is present at the two inputs of the difference generator 33. The difference is therefore zero. If the current transformer 20 becomes saturated, the secondary current $J_2$ becomes greatly distorted with respect to the sinusoidal shape, as has already been explained with the aid of FIG. 1, and contains frequencies which do not correspond to the mains frequency in the sense of a Fourier analysis. These are attenuated and phase-shifted by the frequency filter 34 so that different secondary currents $J_2$ and $J_2'$ are present at the difference generator 33. If the difference between $J_2$ and $J_2'$ exceeds a value predetermined by the trigger threshold of the trigger 35, the saturation signal X is generated. The trigger threshold of the trigger 35 is advantageously set to a fraction, for example 20% of the maximum value of the secondary current $J_2$. In order to derive the trigger threshold, the low-pass filter 36, the circuit for maximum value detection 37 and the voltage divider 38 are connected in series to the input 31 of the saturation detector 30.

In the low-pass filter 36, the secondary current $J_2$ is first smoothed before its maximum value is detected with the circuit for maximum value detection 37. The trigger threshold is then tapped off at the voltage divider 38 as a fraction of the maximum value. An additional possibility of changing over the divider ratio of the voltage divider 38 can be provided by a second switch 39a. The time of changing over is advantageously correlated with the time of the start of saturation. For this the first integrator 39b, the second trigger 39c and the delay element 39d are connected in series to the output of the difference generator 33. The output of the delay element drives the switching input of the second switch 39a. The delay time of the delay element 39d is advantageously 2 ms.

The polarity detector 40 is advantageously provided with the second difference generator 43, the first input of which is connected directly to the first input 41 of the polarity detector 40, while its second input is likewise connected to the first input 41 of the polarity detector 40, but via the second frequency filter 44. The output of the second difference generator 43 drives, via the second integrator 45, the input 46a of the comparator 46, the output of which is connected to the output 42 of the polarity detector 40.

In another embodiment, the first frequency filter 34 and the first integrator 39b from the polarity detector 30 can also be used for this purpose, instead of the second difference generator 43, the second frequency filter 44 and the second integrator 45, in a different embodiment the first difference generator 33. The connecting line 80 then required between the saturation detector 30 and the polarity detector 40 has been drawn in dashed lines in FIG. 2.

If the difference at the output of the second difference generator 43 has a positive polarity, the input 46a of the comparator 46 is positive with respect to the reference input 46b which is at zero potential. In this case, for example, the binary "1" state appears at the output of the comparator 46. If the difference is of negative polarity, the conditions are exactly opposite and, for example, the binary "0" state appears at the output of the comparator.

The zero-transition detector advantageously has the squaring circuit 55 and the edge trigger 56 in series between its first input 51 and its output 54. The input 56a, determining the polarity of the trigger edges, of the edge trigger 56 is connected to the output of the D-type flip-flop 57, the clock input of which is driven by the second input 52 and the D input of which, which is subordinate to the clock input 52, is driven by the third input 53 of the zero-transition detector 50.

The extrapolation circuit 60 has between its second input 62 and its output 63, advantageously in series, the clock generator 64, the counter 65, the read-only memory 66 and the multiplying digital/analog converter 67. The first input 61 of the extrapolation circuit 60 is connected via the sample/hold element 68 to the input 67a, which determines the multiplication factor, of the multiplying digital/analog converter 67. In addition, the input 68a, which determines the sampling time, of the sample/hold element 68 is connected via the address decoder 69 to the output of the counter 65.

The zero-transition signal N is used to start the clock generator 64 and the counter 65 starts counting in synchronism with it. The counter 65 is advantageously a binary counter. The numbers generated by the counter 65 are used as address by the read-only memory 66. The read-only memory 66 passes the contents of the respective address present on to the multiplying digital/analog converter 67. The connection between the counter 65 and the read-only memory 66 thus consists of a plurality of address lines A as determined by the coding of the numbers in the counter 65. Accordingly, the connection between the read-only memory 66 and the multiplying digital/analog converter 67 consists of a plurality of data lines D. The contents of the addresses of the read-only memory 66 consist of sinewave values calculated in uniform steps for an increasing argument of between 0° and 360°. The number of sinewave values stored corresponds to the factor by which the frequency of the clock generator 64 is higher than the mains frequency. This factor is for example 200.

The multiplying digital/analog converter 67 generates from the sequence of discrete sinewave values the analog or, more exactly, the stepped current signals C which can still be smoothed by a filter section not shown in FIG. 2.

Since the clock generator 64 is started with the zero-transition signal N generated with selected zero transitions of the secondary current $J_2$, the current signal C is automatically in synchronism with the secondary current $J_2$. Only its amplitude remains to be matched to the latter. For this purpose, for example, with a counter state of 30°, the instantaneous value of the secondary current $J_2$ is detected via the sample/hold element 68 and from this time the current signal C is multiplied by this instantaneous value in the multiplying digital/analog converter. The address decoder 69 signals to the sample/hold element 68 when the counter state of 30° has been reached.

So that the protective systems are supplied with the current signal C only after its amplitude has been matched to the secondary current $J_2$, an AND element 90 can also be provided in the control line of the first switch 70. This element is driven by the output 32 of the saturation detector 30, that is to say by the saturation signal X and, via the latch element 91, by the output of the address decoder 69.

FIG. 3 shows one use of the system according to the invention in a multi-phase electric energy supply network by means of the example of a three-phase mains network with one current transformer $20_R$, $20_S$, $20_T$ for each of the phases R, S and T.

Since, in the event of a one-line-short-circuit, that is to say a short-circuit between one of the three phases R, S, T and ground, only one of the three current transformers $20_R$, $20_S$, $20_T$ can become saturated and in the event of multi-line short-circuits, only the currents of two of the possibly more than two short circuited phases R, S, T are analyzed by the protective systems, it is in principle sufficient, in the case of a three-phase mains network, to install the system according to the invention in duplicate. Connecting the currents of the short-circuited phase, or phases, R, S, T to one of the systems according to the invention, or to both of these systems, can be effected by means of a known selection circuit, for example as is known from the document "Relays and Protective Engineering" CH-ES 25-90 (1981) by Messrs. BBC—Brown, Boveri & Cie., 5400 Baden/- Switzerland. Since every selection circuit has a certain switching delay but a saturation of one of the current transformers $20_R$, $20_S$, $20_T$ and the displacement of the saturation must be detected at the earliest possible time, it is of advantage, as shown in FIG. 3, to provide, for each of the current transformers $20_R$, $20_S$, $20_T$, one saturation detector $30_R$, $30_S$, $30_T$ and one polarity detector $40_R$, $40_S$, $40_T$ per phase R, S, T.

In contrast to this, only two zero-transition detectors $50_I$, $50_{II}$, two extrapolation circuits $60_I$, $60_{II}$ and two first switches $70_I$, $70_{II}$ need to be provided.

One of the three current transformers $20_R$, $20_S$, $20_T$, in each case and the saturation detector, $30_R$, $30_S$, $30_T$, and polarity detector, $40_R$, $40_S$, $40_T$, connected to the current transformer in question, can be connected via the selection logic 100, either to the primary zero-transition detector $50_I$, the primary extrapolation circuit $60_I$ and the primary first switch $70_I$ or to the secondary zero transition detector $50_{II}$, the secondary extrapolation circuit $60_{II}$ and the secondary first switch $70_{II}$. One possible connection is shown in FIG. 3, by dashed lines within the selection logic 100.

We claim:

1. A system for generating an analyzable current signal from the secondary current of a saturated transformer whose primary windings are connected to a line in an electric power supply network, comprising:
    a saturation detector having an input connected to a secondary winding of the transformer;
    a polarity detector having an input connected to said secondary winding;
    an extrapolation circuit having a first input connected to said secondary winding;
    a zero transition detector having a first input connected to said secondary winding, a second input connected to said saturation detector and a third input connected to said polarity detector, and an output connected to a second input of said extrapolation circuit; and
    a switch having one input connected to said secondary winding and a second input connected to said extrapolation circuit, and being responsive to an output from said saturation detector for switching between said two inputs.

2. A system as claimed in claim 1, wherein between the first input and the output of the zero-transition detector a squaring circuit and an edge trigger are connected in series, an input, determining the polarity of the trigger edges, of the edge trigger being connected to the output of a D-type flip-flop, the clock input of which is driven by the second input, and the D input of which is driven by the third input of the zero-transition detector.

3. Application of the system as claimed in claim 1 in a multi-phase electric energy supply network provided with one current transformer for each of the phases wherein a saturation detector and a polarity detector are connected to each current transformer and at least one zero-transition detector, at least one extrapolation circuit and at least one switch can be connected, via a selection switch, to one of the current transformers and to the saturation detector and polarity detector which are connected to this current transformer.

4. A system as claimed in claim 1, wherein between the second input and the output of the extrapolation circuit a clock generator, a counter, a read-only memory and a multiplying digital/analog converter are connected in series.

5. A system as claimed in claim 4, wherein the first input of the extrapolation circuit is connected via a sample/hold element to an input of the multiplying digital/analog converter which determines the multiplication factor and an input of the sample/hold element which determines the sampling rate is connected via an address decoder to the output of the counter.

6. A system as claimed in claim 5, wherein the output of the saturation detector is connected via an AND element to a switching input of said switch and another input of the AND element is connected via a latch element to the output of the address decoder.

7. A system as claimed in claim 1, wherein the saturation detector is provided with a first difference generator, the first input of which is connected directly to the input of the saturation detector, and the second input of which is connected to the input of the saturation detector via a first frequency filter, and with a first trigger which is connected after the first difference generator and the output of which is connected to the output of the saturation detector.

8. A system as claimed in claim 7, wherein a low-pass filter, a circuit for maximum value detection and a voltage divider having at least one tap for the trigger threshold of the first trigger are connected in series to the input of the saturation detector.

9. A system as claimed in claim 8 wherein the trigger threshold of the first trigger can be changed, via a second switch, by at least two different taps of the voltage divider, and the second switch is controlled by a first integrator, a second trigger and a delay element, which are connected in series to the output of the first difference generator.

10. A system as claimed in one of claims 1, 7, 8 or 9, wherein the polarity detector is provided with a second difference generator, the first input of which is connected directly to the input of the polarity detector, and the second input of which is connected to the input of the polarity detector via a second frequency filter, and the output of the polarity detector is applied, via a second integrator, to an input of a comparator the output of which forms an output of the polarity detector.

11. A method for deriving an analyzable current signal from the secondary current of a saturated current transformer, the primary side of which is connected to a line of an electric power supply network, comprising the steps of:
detecting the onset of saturation of the transformer and generating a saturation signal;
generating a polarity signal indicative of the polarity of the primary current in the transformer;
selecting zero transitions in the secondary current in response to said saturation and polarity signals, said selected zero transitions being related to a particular polarity of the primary current; and
extrapolating the secondary current on the basis of said selected zero transitions, to derive said current signal.

12. The method of claim 11 wherein said extrapolating step comprises generating a sinusoidal signal which is synchronized with said selected zero transitions, determining the instantaneous value of the secondary current at a preset time period after each zero transition, and multiplying the amplitude of said sinusoidal signal by said determined value.

13. The method of claim 12 wherein said sinusoidal signal is generated by storing discrete instantaneous values of a signal in binary coded form, reading the stored values in succession, and converting the values which are read into an analog signal.

14. The method of claim 11 wherein the detection of the onset of saturation and generation of the saturation signal comprises the steps of determining the difference in magnitude between the secondary current and a frequency filtered version of the secondary current, comparing this difference to a threshold value, and generating a signal when the difference exceeds the threshold value.

15. The method of claim 14, wherein said threshold value is consecutively adjusted to different fractions of the maximum value of the secondary current.

16. The method of claim 11, wherein said polarity signal is generated by comparing the secondary current with a frequency filtered version of the secondary current.

17. The method of claim 14 or 16, wherein the frequency filtering of the secondary current results in attenuation and phase-shifting of the component frequencies in the secondary current other than the power supply frequency.

* * * * *